(12) United States Patent
Xu et al.

(10) Patent No.: US 9,064,323 B2
(45) Date of Patent: Jun. 23, 2015

(54) METHOD AND APPARATUS FOR ESTIMATION OF INTERFRAME MOTION FIELDS

(75) Inventors: Sanbao Xu, Lund (SE); Harald Gustafsson, Lund (SE); Per Thorell, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 789 days.

(21) Appl. No.: 13/390,972

(22) PCT Filed: Jul. 7, 2010

(86) PCT No.: PCT/EP2010/059708
§ 371 (c)(1),
(2), (4) Date: May 7, 2012

(87) PCT Pub. No.: WO2011/020647
PCT Pub. Date: Feb. 24, 2011

(65) Prior Publication Data
US 2012/0218473 A1 Aug. 30, 2012

Related U.S. Application Data

(60) Provisional application No. 61/236,650, filed on Aug. 25, 2009.

(30) Foreign Application Priority Data

Aug. 21, 2009 (EP) .................................... 09168348

(51) Int. Cl.
*H04N 7/32* (2006.01)
*H04N 11/02* (2006.01)
(Continued)

(52) U.S. Cl.
CPC . *G06T 7/20* (2013.01); *H04N 5/145* (2013.01); *H04N 7/50* (2013.01); *G06T 3/4053* (2013.01); *G06T 2207/10016* (2013.01); *H04N 19/527* (2014.11); *H04N 19/537* (2014.11)

(58) Field of Classification Search
CPC ... H04N 5/145; H04N 7/26765; H04N 7/364; G06T 2207/10016; G06T 7/2013

USPC ............ 348/699; 375/240.01, 240.12, 240.16
See application file for complete search history.

(56) References Cited

U.S. PATENT DOCUMENTS 5,696,848 A * 12/1997 Patti et al. ..................... 382/254
2003/0189983 A1* 10/2003 Hong ....................... 375/240.27
(Continued)

FOREIGN PATENT DOCUMENTS

| EP | 1351502 A1 | 10/2003 |
| WO | 2009087493 A1 | 7/2009 |
| WO | 2009087641 A2 | 7/2009 |

OTHER PUBLICATIONS

Chiang, M-C, et al., "Efficient Image Warping and Super-Resolution", Applications of Computer Vision, 1996, WACV '96, Proceedings 3rd IEEE Workshop on Sarasota, FL, USA Dec. 2-4, 1996, Los Alamitos, CA, IEEE Comput. Soc. US, Dec. 2, 1996, pp. 56-61, XP010206411.
(Continued)

*Primary Examiner* — Jessica M Prince
*Assistant Examiner* — On S Mung
(74) *Attorney, Agent, or Firm* — Rothwell, Figg, Ernst & Manbeck, P.C.

(57) ABSTRACT

The invention relates to a method for estimation of interframe motion fields operating on a stream of video frames, and more particularly for accelerating video output in multiframe super-resolution thus improving the efficiency of the multiframe integration. Relative motion field estimation is used between neighboring or close images instead of with respect to a reference image, for at least some of the frames within an integration window (TOI). The integration window is slid along the time axis each time by one (or two or a few) frames so that the current integration window preferably covers the majority of the frames in the previous integration window. Using relative motion estimation and then (tracking and) summing up the related motion fields enables, in each recursion, the absolute motion fields in a new integration window to be obtained without re-computing all the motion fields of earlier frames in the new integration window.

18 Claims, 4 Drawing Sheets

(51) Int. Cl.
*H04N 5/14* (2006.01)
*H04N 7/12* (2006.01)
*G06T 7/20* (2006.01)
*G06T 3/40* (2006.01)
*H04N 19/527* (2014.01)
*H04N 19/537* (2014.01)
*H04N 19/61* (2014.01)

(56) References Cited

U.S. PATENT DOCUMENTS

| | | | | |
|---|---|---|---|---|
| 2004/0105598 A1* | 6/2004 | Kondo et al. | | 382/307 |
| 2004/0252230 A1* | 12/2004 | Winder | | 348/402.1 |
| 2005/0232514 A1 | 10/2005 | Chen | | |
| 2006/0280250 A1* | 12/2006 | Ishii | | 375/240.16 |
| 2007/0071362 A1* | 3/2007 | Milanfar et al. | | 382/299 |
| 2008/0279282 A1* | 11/2008 | Kobayashi et al. | | 375/240.24 |
| 2009/0252426 A1* | 10/2009 | Mathew et al. | | 382/238 |
| 2010/0027900 A1* | 2/2010 | Tetsukawa et al. | | 382/236 |
| 2010/0182511 A1* | 7/2010 | Xu | | 348/699 |
| 2010/0183075 A1* | 7/2010 | Furukawa et al. | | 375/240.16 |
| 2010/0272184 A1* | 10/2010 | Fishbain et al. | | 375/240.16 |
| 2010/0290529 A1* | 11/2010 | Topiwala | | 375/240.16 |

OTHER PUBLICATIONS

Schultz, Richard R. et al., "Multiframe Integrations via the Projective Transformation with Automated Block Matching Feature Point Selection", ICASSP, IEEE International Conference on Acoustics, Speech and Signal Processing—Proceedings 1999 IEEE, vol. 6, 1999, pp. 3265-3268, XP002559462.

\* cited by examiner

METHOD AND APPARATUS FOR ESTIMATION OF INTERFRAME MOTION FIELDS

CROSS-REFERENCE TO RELATED APPLICATIONS

This application is a 35 U.S.C. §371 National Phase Entry Application from PCT/EP2010/059708, filed Jul. 7, 2010 (published as WO 2011020647), and designating the United States, which claims priority to EP Application No. 09168348.2, filed Aug. 21, 2009 and U.S. Provisional Application No. 61/236,650, filed Aug. 25, 2009. The entirety of each above identified application and publication is incorporated by reference herein.

TECHNICAL FIELD

The present invention relates to a method for estimation of interframe motion fields operating on a stream of video frames in connection with multiframe integration, and more particularly for accelerating video output in multi-frame super-resolution thus improving the efficiency of the multi-frame integration.

The present invention also relates to the corresponding apparatus and computer program product.

BACKGROUND

Multi-frame integration in video (image sequence) processing is an important and useful technology that has drawn much attention recently. One user case and application example is multi-frame super-resolution (EP 09150632.9, filed 15 Jan. 2009) in which a frame with improved resolution is created from a sequence of frames combined. Another one is conversion of conventional videos to high definition, HD, videos.

Estimation of the inter-frame motion fields is an essential part in multi-frame integration, and as a matter of fact the most time-consuming part. When video output with a high enough rate (e.g., around 30 frames per second) is required, the multi-frame integration process has to be done recursively at a similar rate. This puts a tight constraint on the motion field estimation stage.

This invention addresses among other things how to speed up the recursion loop and proposes a solution to the acceleration of the motion field estimation loop.

FIG. 1 illustrates schematically how one video output multi-frame super-resolution (Mf-SR) frame is generated in the prior art. N frames of the input video sequence are to be integrated over a Time of Integration (TOI) window to deliver each frame of the output video in Mf-SR. Within the TOI window, one frame is selected as the reference frame, here the first one #0, but may also be e.g. the last one #N−1. Then the inter-frame motion fields of all the rest frames with respect to the chosen reference frame are computed. A motion field relating to two frames consists of a vector for each pixel pointing from one pixel in one frame to the corresponding pixel in the other frame, in other words representing the motion of the pixel between the two frames. With the known motion fields, all the images within the TOI window are aligned and a high resolution image (as one output video frame in Mf-SR) from N frames of the low resolution input video is generated, as suggested in EP 09150632.9. For the initial TOI window consisting of frames #0 to N−1, the first output frame in Mf-SR is generated. For next TOI window frames #1 to N are used etc.

The motion vectors between two frames can be estimated by one of the conventional methods e.g. as described in the article by L. Barron, D. J. Fleet, and S. S. Beauchemin, Performance of optical flow techniques, *International Journal of Computer Vision*, 12(1):43-77, 1994.

Image pair-wise motion fields $M_{r,j}$ between the reference frame r and other target frame j ($r<j<r+N$) need to be estimated. One implementation would be using the first frame of the TOI as the reference frame (FIG. 1). With frame 0 being the reference frame, we need to estimate $M_{0,1}, M_{0,2}, \ldots, M_{0,N-1}$. As the recursion proceeds with the next TOI window, another frame r in the input video sequence is taken as the reference frame later on. Then we need $M_{r,r+1}, M_{r,r+2}, \ldots, M_{r,r+N-1}$. This means that in general we have to estimate N−1 motion fields within each TOI window.

An alternative implementation is using the last frame of the TOI as the reference frame (not shown). In this case, frame N−1 is the reference one, and similar to the previous case, we need to compute N−1 new motion fields within one TOI window or each time the reference frame is changed as the TOI window moves along the time axis.

There is one main problem with this method. The motion (vector) field of each image within the TOI is to be estimated with respect to the reference image (either the first or the last image of the TOI), with a total of N−1 motion fields. This is referred to as absolute motion estimation within the TOI window. As the recursion goes on, the TOI window shifts along the time axis and the reference image needs to be re-defined. Thus, the motion fields of all the images that remain in the new TOI have to be re-computed (with respect to the new reference image), which is a large computation burden.

SUMMARY

In the present invention one solution to this problem is to use relative motion field estimation between neighboring or close frames instead of with respect to the reference frames, for at least some of the frames within the TOI window. Using overlapped TOI windows means that the TOI window is slid along the time axis each time by one (or two or a few) frames so that the current TOI window preferably covers the majority of the frames in the previous TOI window. Using relative motion estimation between two neighboring images and then (tracking and) summing up the related motion fields enables obtaining, in each recursion, the absolute motion fields in a new TOI window without recomputing all the motion fields of earlier frames in the new TOI window.

In order to improve on prior art solutions there is provided, according to a first aspect, a method for estimation of interframe motion fields operating on a stream of video frames in multiframe integration, comprising:
  obtaining motion fields for a first set of (N) frames within a time of integration window;
  shifting the time of integration window by a number of frames (P) to a subsequent time of integration window;
  for a subsequent set of frames within the subsequent time of integration window, calculating relative motion fields (m), only for frames not in the previous time of integration window;
  calculating absolute motion fields (M) between each frame and a reference frame of the subsequent time of integration window using the calculated relative motion fields (m) together with the applicable motion fields of the previous time of integration window.

In one embodiment, absolute motion fields (M) between each frame and a reference frame of the subsequent time of integration window are calculated using the calculated relative motion fields (m) together with the applicable relative motion fields (m) of the previous time of integration window.

In another embodiment, absolute motion fields (M) between each frame and a reference frame of the subsequent time of integration window are calculated using the calculated relative motion fields (m) together with the applicable absolute motion fields (M) of the previous time of integration window.

The absolute motion fields (M) between each frame and a reference frame being the last frame (N−1) within the time of integration window using the relative motion fields (m) may be calculated (630) by tracking and adding the relative motion fields (m) vector-wise, e.g. using $$M_{0,N-1}(x,y)=m_{0,1}(x,y)+m_{1,2}(x+u_{0,1}(x,y),y+v_{0,1}(x,y))+\ldots+m_{N-2,N-1}(x+u_{0,1}(x,y)+\ldots+u_{N-2,N-1}(x,y),y+v_{0,1}(x,y)+\ldots+v_{N-2,N-1}(x,y)),$$

where $u_{0,1}(x,y)$ and $v_{0,1}(x,y)$ are the x- and y-components of $m_{0,1}(x,y)$, which is a motion vector of the motion field $m_{0,1}$ at pixel location (x,y), i.e., $m_{0,1}(x,y)=[u_{0,1}(x,y)\ v_{0,1}(x,y)]^T$.

The absolute motion fields (M) between each frame and a reference frame being the last frame (N−1) within the time of integration window using the relative motion fields (m) may be calculated (630) by tracking and adding the relative motion fields (m) vector-wise, e.g. using $$M_{0,N-1}(X,Y)=m_{0,1}(X,Y)+m_{1,2}(X+u_{0,1}(X,Y),Y+v_{0,1}(X,Y))+\ldots+m_{N-2,N-1}(X+u_{0,1}(X,Y)+\ldots+u_{N-2,N-1}(X,Y),Y+v_{0,1}(X,Y)+\ldots+v_{N-2,N-1}(X,Y)),$$

where $u_{0,1}(X,Y)$ and $v_{0,1}(X,Y)$ are the x- and y-components of $m_{0,1}(X,Y)$, which is a motion vector of the motion field $m_{0,1}$ of the macro-block with index (X,Y), i.e., $m_{0,1}(X,Y)=[u_{0,1}(X,Y)\ v_{0,1}(X,Y)]^T$.

The absolute motion fields (M) between each frame and a reference frame being the last frame (N−1) within the time of integration window using the relative motion fields (m) may be calculated (630) by tracking and adding the relative motion fields (m) vector-wise, e.g. using $$M_{0,N-1}=m_{0,1}+m_{1,2}+\ldots,+m_{N-2,N-1}$$

where M and m are global motion vectors of the respective frames.

A further embodiment comprises:
shifting the time of integration window by a number of frames (P) to a subsequent time of integration window;
for a subsequent set of frames within the subsequent time of integration window, calculating a number of P relative motion fields (m) between neighboring pairs of frames, only for frames not in the previous time of integration window;
calculating absolute motion fields (M) between each frame and a reference frame of the subsequent time of integration window using the calculated relative motion fields (m) together with the applicable motion fields of the previous time of integration window.

A still further embodiment comprises:
for consecutive time of integration windows, calculating new relative motion fields (m) between pairs of frames with alternating non-equal distances between them.

The alternating non-equal distances may be determined by a periodic pattern.

Suitably, the alternating non-equal distances are alternately a short distance, e.g. one frame, and a relatively longer distance, e.g. three or more frames.

Alternatively, the alternating non-equal distances are alternately a short distance of P frames, and a relatively longer distance.

The relative motion fields (m) between neighboring pairs of frames may be estimated by differential (i.e. gradient) or block-based methods.

The motion fields between non-neighboring pairs of frames may be estimated by block-based matching methods.

Suitably, the search range of the matching algorithm is set to a first value for short distance motion estimation, and to a relatively larger value for long distance motion estimation.

Preferably, the estimated motion fields (vectors) are filtered.

In a second aspect, there is provided an apparatus comprising processing means and memory means that are configured to perform the method as summarized above. The apparatus according to the second aspect may, according to a third aspect, be comprised in a mobile communication device, and a computer program according to a fourth aspect may comprise software instructions that, when executed in a computer, performs the method according to the first aspect. These further aspects provide corresponding effects and advantages as discussed above in connection with the first aspect.

BRIEF DESCRIPTION OF THE DRAWINGS

Embodiments will now be described with reference to the attached drawings, where.

DETAILED DESCRIPTION OF EMBODIMENTS

The present invention may be useful and realized in devices displaying video from a stream of video data received and streamed down through a set-up communication or played back from a memory. Examples include mobile communication devices, e.g. a mobile phone, as described below with reference to FIG. 6, and computers. Embodiments of the invention will be described below with reference to the figures.

A stream of input video is to be presented or stored with improved resolution. The stream consists of frames containing pixel values on a two dimensional grid at a certain resolution. By integration of a number of frames, the information from the frames is combined into an output frame having improved resolution. The integration process includes calculation of the motion field between the frames and placing the normalized pixel values in a tighter grid in the output frame, which thus acquires multi-frame super-resolution (Mf-SR), as is known in the prior art.

Figure 1:
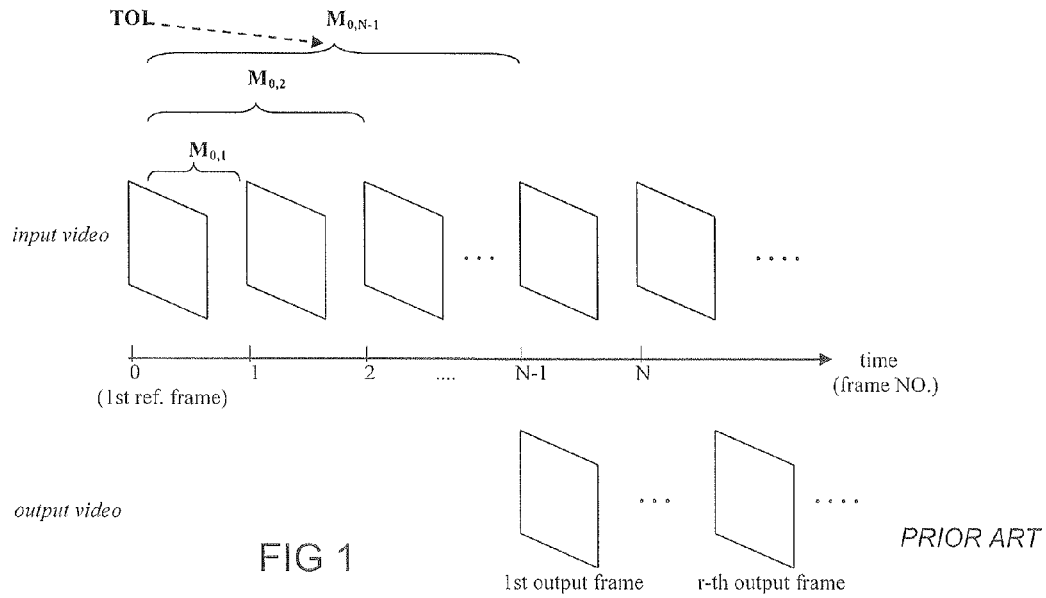
FIG. 1 is a diagram of estimation of interframe motion fields operating on a stream of video frames according to prior art.
Figure 2:
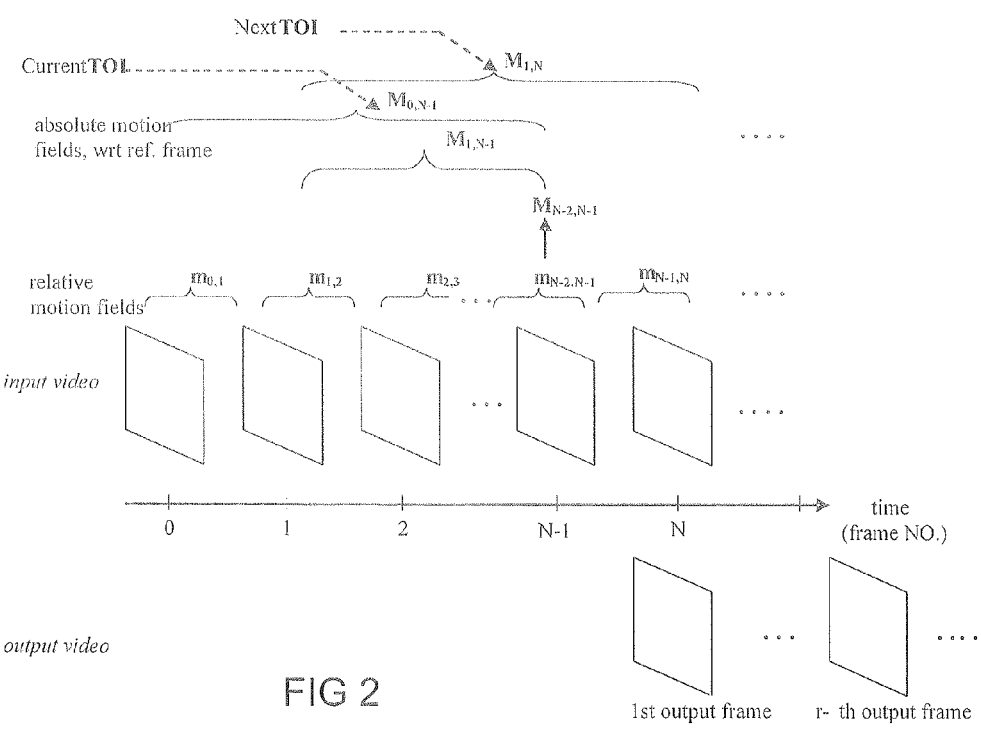
FIG. 2 is a diagram of estimation of interframe motion fields according to an embodiment of the present invention.

An embodiment of the present invention is described with reference to FIG. 2. A time of integration (TOI) window is selected to contain a number of N frames. A typical value of N is 5 to 30 depending on the input and output video frame rate and available calculation capacity. The frames of the current or initial TOI window are numbered 0 to N−1. The last frame of the TOI window is selected as reference frame, initially frame number N−1.

The motion field between a pair of consecutive (neighboring) images is estimated first: between frame 0 and 1; between frame 1 and 2; . . . ; between frame N−2 and N−1. Note that these incremental motion fields are relative within each pair and are not calculated with respect to any common reference frame. In this specification, such a motion field is referred to as a relative motion field. Then, motion fields between each frame and the reference frame within the TOI is calculated from these relative motion fields. In this specification, a motion field between a frame and a reference frame is referred to as an absolute motion field. By adding up the relative motion fields, we can compute the absolute motion vectors $M_{0,N-1}, M_{1,N-1}, \ldots, M_{N-2,N-1}$ of each frame with respect to the common reference frame within the current TOI. Take the first frame 0 for example; in order to obtain $M_{0,N-1}$, we (track and) add $m_{0,1}, m_{1,2}, \ldots$ and $m_{N-2,N-1}$ vector-wise. In case motion vectors are to be calculated for all pixels (x,y), $M_{0,N-1}$ (per pixel) can be expressed as:

$$M_{0,N-1}(x,y) = m_{0,1}(x,y) + m_{1,2}(x+u_{0,1}(x,y),y+v_{0,1}(x,y)) + \ldots + m_{N-2,N-1}(x+u_{0,1}(x,y)+\ldots+u_{N-2,N-1}(x,y),y+v_{0,1}(x,y)+\ldots+v_{N-2,N-1}(x,y))$$

where $u_{0,1}(x,y)$ and $v_{0,1}(x,y)$ are the x- and y-components of $m_{0,1}(x,y)$, which is a motion vector of the motion field $m_{0,1}$ at pixel location (x,y), i.e., $m_{0,1}(x,y) = [u_{0,1}(x,y)\ v_{0,1}(x,y)]^T$.

The terms are increasingly longer as the argument of the relative motion field contains further tracked motion vectors from previous motion fields. Similar notation holds for other motion fields and motion vector components. The tracking of vectors is straightforward since a motion vector points to where the pixel or the image block goes. Note that interpolation may be needed, in general, for the vector summation in the above equation in order to obtain the value for the position in the output video frame grid having higher resolution. However, if the zooming factor and the subpixel accuracy of the motion estimation are reciprocal of each other, then the estimated motion vectors are integers in the high resolution image, and thus interpolation in the vector summation can be avoided.

In case of block-based motion estimation each frame is divided into macro-blocks, and only one motion vector is estimated for each macro-block. $M_{0,N-1}$ for a macro-block is calculated similarly as above, substituting block indices for (x,y). In case of global motion, i.e. it is one and the same motion vector for the whole frame, the global motion vector $M_{0,N-1}$ can be calculated as only one addition which can be expressed as $M_{0,N-1}$ above but without indices.

Thus, expressed for macro-blocks, $$M_{0,N-1}(X,Y) = m_{0,1}(X,Y) + m_{1,2}(X+u_{0,1}(X,Y),Y+v_{0,1}(X,Y)) + \ldots + m_{N-2,N-1}(X+u_{0,1}(X,Y)+\ldots+u_{N-2,N-1}(X,Y),Y+v_{0,1}(X,Y)+\ldots+v_{N-2,N-1}(X,Y))$$

where $u_{0,1}(X,Y)$ and $v_{0,1}(X,Y)$ are the x- and y-components of $m_{0,1}(X,Y)$, which is a motion vector of the motion field $m_{0,1}$ of the macro-block with index (X,Y), i.e., $m_{0,1}(X,Y) = [u_{0,1}(X,Y)\ v_{0,1}(X,Y)]^T$.

With global notation we get, $$M_{0,N-1} = m_{0,1} + m_{1,2} + \ldots + m_{N-2,N-1},$$

where M and m are global motion vectors of the respective frames.

In this embodiment, the next TOI (the TOI of the next integration/recursion) is shifted by one frame. Thus, the initial TOI window contains a first set of frames 0 to N−1, while the second TOI window contains a second set of frames 1 to N of which only the last frame is new, and the first frame 0 has been shifted out of the current TOI window. In this TOI, we need the motion fields $M_{1,N}, \ldots$ of the frames from the new first frame (frame 1) up to frame N−1 with respect to the new reference frame (frame N). In this and all subsequent TOI windows, only one new motion field, in this case $m_{N-1,N}$, has to be calculated, since all other pair-wise relative motion fields are available as they are calculated in the previous TOI window and may be reused. This is true until the scene of the video stream is changed completely. Thus, $M_{1,N}$ (per pixel) is obtained by $$M_{1,N}(x,y) = m_{1,2}(x,y) + m_{2,3}(x+u_{1,2}(x,y),y+v_{1,2}(x,y)) + \ldots + m_{N-2,N-1}(x+u_{1,2}(x,y)+\ldots+u_{N-2,N-1}(x,y),y+v_{1,2}(x,y)+\ldots+v_{N-2,N-1}(x,y)),$$

In other words, it is readily seen that when we shift the TOI (change the reference frame for the next TOI), we only need to compute the most recent relative motion field, $m_{N-1,N}$ without re-calculating the earlier motion fields ($m_{1,2} \ldots m_{N-2,N-1}$) all over again (now with respect to the new reference frame at frame number N). The absolute motion fields are thus obtained without repetition of the heavy motion estimation. This is a huge speed-up gain over the absolute motion estimation approach of the prior art.

It is seen that the calculation of the absolute motion fields of subsequent TOI windows does not depend on how the relative and/or absolute motion fields of the initial TOI window were obtained; they only need to be accessible. Thus, they may be obtained by conventional methods with or without super-resolution. After some frames have been integrated, the information emanating from the initial TOI window is no longer present anyway, and the process according to embodiments of the invention proceeds with super-resolution but without repetition of the heavy motion estimation.

If the frame rate of the input video is high enough so that it is permissible to reduce the frame rate of the output video (without aliasing effect in time sampling), then it is possible to slide the TOI by P (more than one) images, that is, the overlapping interval between two neighboring TOI windows become smaller. In that case, we need, for each recursion, to compute P new relative motion fields since P earliest relative motion fields are shifted out of the new TOI.

Thus, in a further more general embodiment, the next TOI is shifted by a number of frames P. In this TOI, we need the motion fields $M_{P,N-1+P}, \ldots$ i.e. from the new first frame (frame P) up to frame N−1+P with respect to the new reference frame (frame N+P). In this and subsequent TOI windows shifted P frames, P new motion fields, in this case $m_{N-1,N}, \ldots m_{N-P-1,N-P}$ has to be calculated, since the other pair-wise relative motion fields are available as they are calculated in the previous TOI window and may be reused. Thus, when we shift the TOI window P frames, we only need to compute the P most recent relative motion fields without re-calculating the earlier motion fields.

Figure 3:
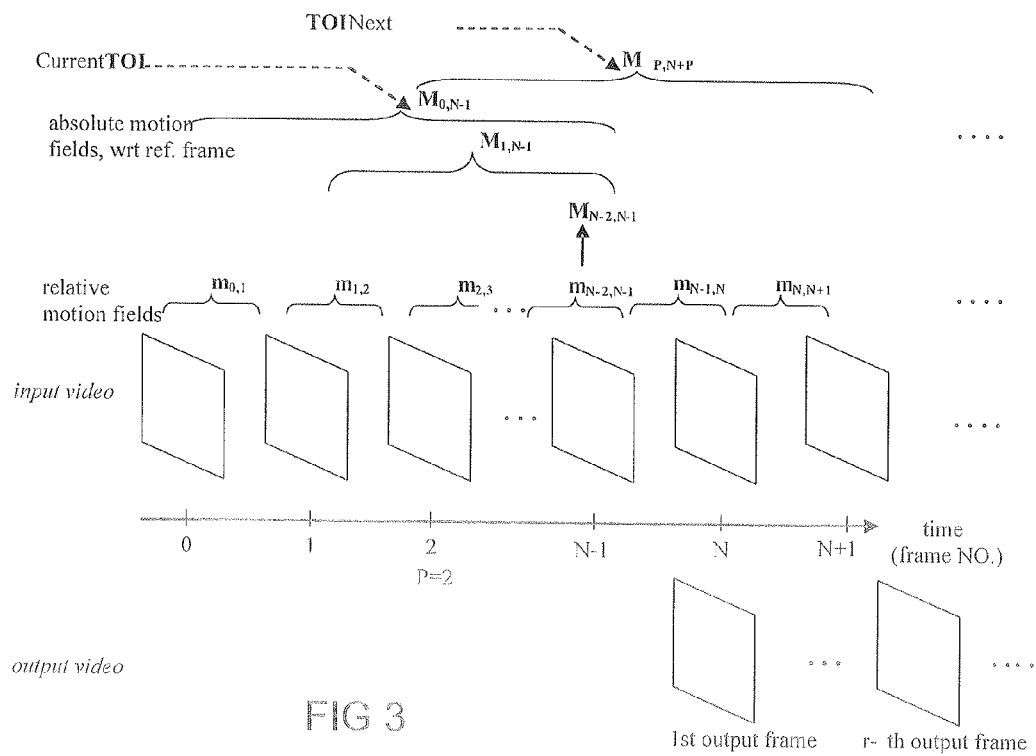
FIG. 3 is a diagram of estimation of interframe motion fields according to a further embodiment of the present invention.

An example is shown in FIG. 3. Here, the next TOI is shifted by P=2 frames. Thus, motion fields $m_{N-1,N}$ and $m_{N,N+1}$ have to be calculated while the motion fields from $m_{2,3}$ may be reused.

As P approaches N, it will be seen that the computational gain decreases over the prior art absolute motion estimation approach. When P≥N, consecutive TOI windows become disjoint, such that all pair-wise relative motion fields must be calculated.

P is selected in dependence of the input and output video frame rate. The output video frame rate equals the input video frame rate/P.

For example, if the input video frame rate is 120 fps (frames per second) and the wanted/required output video frame rate is 30 fps, P=4 is selected. Selecting P<4 would result in wasted calculations, and selecting P>4 would decrease the output video frame rate. N is suitably selected such that the reuse gain of the present invention is exploited, e.g. N=16.

As another example, if the input video frame rate equals the output video frame rate=30 fps, P=1 is selected. Thus, the reuse gain of the present invention is exploited, even with a low e.g. N=5.

In an alternative embodiment (not shown), the first frame of the respective TOI windows is selected as reference frame, initially frame number 0. The changes of the above expressions are straightforward, and it will be readily seen by persons skilled in the art that the same amount of calculations is involved and hence the same savings over the prior art are obtained.

There is an additional advantage with relative motion estimation. Since the relative motion between consecutive frames usually is small, it is possible to further speed up its calculation. If a block-based motion estimation method/algorithm is employed, a small search range in the block searching process can be used. In other words, calculating the relative motion field $m_{0,1}$ can use a smaller search range in the motion estimation than e.g. calculating the absolute $M_{0,N}$ directly. Using a smaller search range means fewer calculations and increased speed. If a differential (optical flow) motion estimation algorithm is used, we can either use smaller size filters to estimate spatial-temporal image derivatives for computing the motion vectors (less computations), or use a single level multiscale optical flow estimation algorithm (simpler algorithm and less computations). So using relative motion estimation according to embodiments of the present invention will also speed up the motion vector estimation operation as such.

By calculating the absolute motion vector across N (at most) images as the sum of N−1 relative motion vectors over two consecutive images, there is a possible accumulation of errors over N−1 (at most) calls. We can fairly suppose that the errors of estimated motion vectors from these N−1 calls are independent random variables and they obey the same probability distribution function. It can be shown that the relative motion estimation is an unbiased estimator of the absolute motion estimation. Intuitively, some errors may be positive while others may be negative. When summing up, these error terms may cancel each other (at least partially). However, the variance of the error in the relative motion estimation may be, in theory, larger than that in the absolute motion estimation. This trade-off is balanced by the increased speed of the relative motion estimation.

A further embodiment employs an alternative way of calculating the absolute motion fields. Here the absolute motion fields are calculated using the absolute motion fields of the previous TOI window, in stead of using the relative motion fields of the previous TOI window. The relative motion field between the old reference frame (of the previous TOI) and the new reference frame (of the current TOI), that is, with the last frame as reference frame, $m_{N-2,N-1}$, is calculated first (as in the previous embodiments). Then each of the absolute individual motion fields $M_{1,N-1}, M_{2,N-1}, \ldots, M_{N-2,N-1}$ of the previous TOI except those that slide out of the current TOI, is added with the motion field $m_{N-1,N}$ between the two reference images. Thus, with a shift of one frame (using the abbreviated notation equal to global motion):

$$M_{1,N} = M_{1,N-1} + m_{N-1,N}$$

$$M_{2,N} = M_{2,N-1} + m_{N-1,N}$$

$$\vdots$$

$$M_{N-1,N} \equiv m_{N-1,N} \text{(calculated first)}$$

With a shift of P frames, P new relative motion fields $(m_{N-1,N}+m_{N,N+1}+\ldots+m_{N+P-1,N+P})$ must be calculated. Thus:

$$M_{P,N+P} = M_{P,N-1} + m_{N-1,N} + m_{N,N+1} + \ldots + m_{N+P-1,N+P}$$

$$M_{P+1,N+P} = M_{P+1,N-1} + m_{N-1,N} + m_{N,N+1} + \ldots + m_{N+P-1,N+P}$$

$$\vdots$$

$$M_{N+P-2,N+P} = m_{N+P-2,N+P-1} + m_{N+P-1,N+P}$$

$$M_{N+P-1,N+P} \equiv m_{N+P-1,N+P} \text{(calculated first)}$$

This avoids recalculating the sums of the relative motion fields for the respective absolute motion fields.

In another embodiment, the relative motion estimation is performed with non-equal frame distances. The new relative motion fields of successive TOI windows are estimated alternatively with short and long distances. For example, for every second frame, the new relative motion fields are estimated between neighboring (or close) frames (short distance), while for the alternate every second frame, the motion fields are estimated between frames further apart (long distance).

Figure 4:
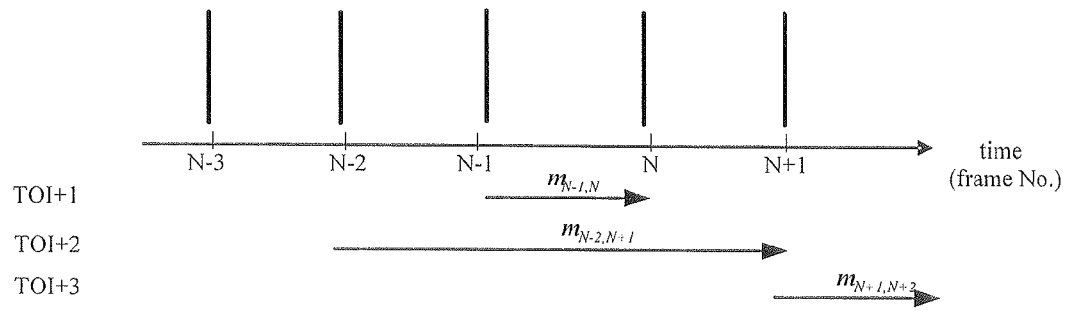
FIG. 4 is a diagram of estimation of interframe motion fields according to a still further embodiment of the present invention.

An example is shown in FIG. 4. As in the previous embodiments, the absolute motion fields with reference to frame N−1 of the initial TOI window are calculated and available. Whether or not, they are calculated with short or long distance motion estimation within that TOI window is of no consequence in the following. In this particular embodiment for the first subsequent TOI window with a shift of one frame, TOI+1, a new relative motion field is calculated as short distance motion estimation pair-wise between frame N−1 and frame N to obtain $m_{N-1,N}$. This is equal to the first embodiment and the absolute motion fields are obtained in the same way by reusing the absolute motion fields and adding the new relative motion field. Thus, in equation form for the first subsequent TOI window:

$$M_{1,N}=M_{1,N-1}+m_{N-1,N}$$

Then, for every second TOI window, TOI+3, TOI+5 . . . , relative motion fields are calculated as short distance motion estimation to obtain $m_{N+1,N+2}$, $m_{N+3,N+4}$, etc.

In this particular embodiment, for the second subsequent TOI window TOI+2, still with a shift of one frame, a new relative motion field is calculated as long distance motion estimation between frame N−2 and frame N+1 to obtain $m_{N-2,N+1}$. Thus, the long distance is here 3 frames. In the second TOI window the absolute motion fields are calculated by adding the new relative motion field to the respective old absolute motion field up to frame N−2. For the final frames N−1 and N, subtractions of old absolute motion fields are required, as the new relative motion field is calculated from an earlier frame, to the left in the figure. As shown below, there are several possibilities depending on the length of the new relative motion field, but generally it is preferred not to subtract large numbers from each other. Thus, in equation form for the second TOI window:

$$M_{2,N+1} = M_{2,N-2} + m_{N-2,N+1}$$
$$\vdots$$
$$M_{N-2,N+1} \equiv m_{N-2,N+1} \text{ (calculated directly)}$$
$$M_{N-1,N+1} = M_{N-3,N-1} - M_{N-3,N-2} + m_{N-2,N+1}$$
$$M_{N,N+1} = M_{N-3,N} - M_{N-3,N-1} + m_{N-2,N+1}; \text{ or}$$
$$M_{N,N+1} = M_{N-2,N} - M_{N-2,N-1} + m_{N-2,N+1}$$

Note that all terms to the right of the equality sign are reused from a previous TOI window except the new relative motion field $m_{N-2,N+1}$.

A shift of P>1 frames is possible, calculating new relative motion fields alternately with short/long distance and reusing the applicable motion fields of the previous TOI window. In this case P new relative motion fields need to be calculated. If the TOI window is moved e.g. P=3 frames, then three new relative motion fields up to frame N+2 must be calculated; these are N−1 to N, N to N+1, and N+1 to N+2, to include contributions from all frames. A short distance greater than P is possible but not a preferred alternative. Either the short distance is always 1 or the difference between the short and the other distance is 1 to be able to calculate absolute motion vectors from the reference image towards all frames in the TOI window.

An advantage of doing motion estimation with non-equal distances is a possible reduction of estimation variance while maintaining the same number of motion fields. When the TOI is long enough (N is large enough), there can be many different choices of inter-frame distances for new relative motion fields. For example, the short distance may be two or three frames, and the relatively longer distance may be up to N frames. Also, in stead of calculating new relative motion fields alternately with short/long distance, other periodic patterns may be used such as short/short/long, short/medium/long, or other combinations.

Figure 5:
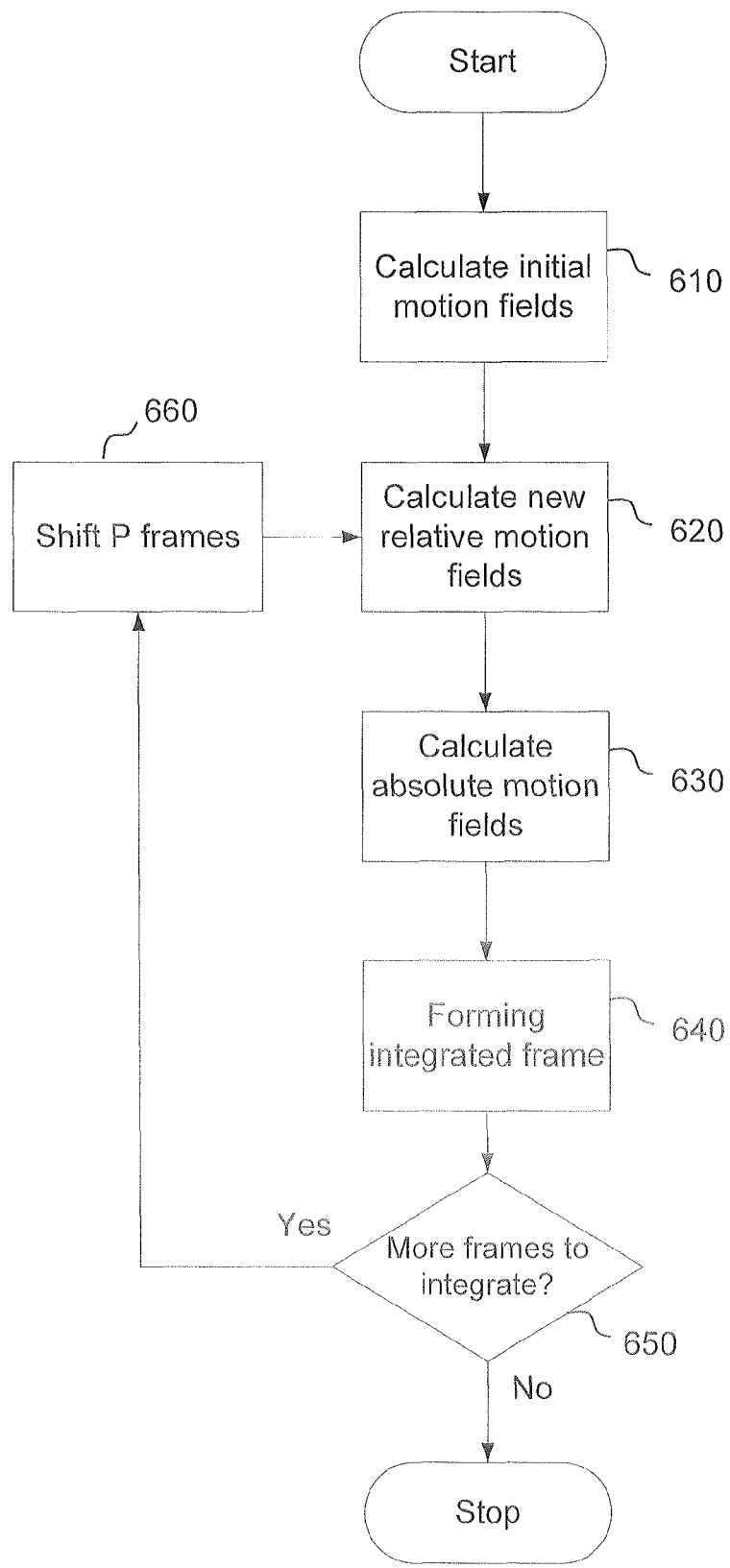
FIG. 5 is a flow chart of estimation of interframe motion fields according to an embodiment of the present invention.

The method of embodiments of the invention may be summarized as follows with reference to FIG. 5. First, in step 610, the initial motion fields are calculated. As noted above, they may be obtained by conventional methods with or without super-resolution. In step 620, new relative motion fields are calculated. If it is the first iteration, the relative motion fields may have been calculated in step 610. In subsequent iterations, a number of P new relative motion fields are calculated. In step 630, absolute motion fields are calculated using new relative motion fields and reusing relative or absolute motion fields from the previous iteration as available. In step 640, the integrated frame is formed for the video output. In step 650, it is determined if there are more frames to integrate. If yes, the TOI window is shifted P frames, and another iteration continues from step 620. In some embodiments, step 620 is performed alternately with non-equal distances. If no, the process stops. (New initial motion fields are calculated for the next video stream, if any).

In practical implementations, the motion vectors between two frames can be estimated by one of the following methods as described in L. Barron, D. J. Fleet, and S. S. Beauchemin, Performance of optical flow techniques, *International Journal of Computer Vision*, 12(1):43-77, 1994: (i) differential (or alternatively designated gradient) methods which are suitable for relatively small motion, that is, for consecutive frames or frames that have short distance in time; (ii) correlation (region) based matching method (a.k.a. block-based matching method, in video coding literature) which are appropriate for both small and large motion, i.e., suitable for both closer frames and more distant frames); or (iii) filter-based methods (including energy based methods). The filter-based methods typically require a large number of velocity-tuned filters and have higher computational and storage overheads than the other two methods. Therefore they are less popular in practice. Using multi-scale (pyramid) schemes, differential methods can also be used in large motion cases (the two frames are far apart).

In non-equal frame distance motion estimation, as described with reference to FIG. 4, there are two alternatives. One can either use different motion estimation algorithms (e.g., a differential or optical flow algorithm for short distance motion estimation and a block-based matching algorithm for long distance motion estimation), or use the same motion estimation algorithm for both short and long distance motion estimation, but with different parameters. For instance, when a block-based matching method is employed, the search range of the matching algorithm may be set to a small value for short distance motion estimation, but a larger value for long distance motion estimation (the exact value depends on the distance between the two frames from which the motion field is to be estimated). Also, the search range may depend on the application, i.e. the video sequence at hand (the motion magnitude, the frame rate, and the image resolution). For example, the search range of the short distance motion estimation may be set to −7 to 7 or −15 to 15 pixel distances and the search range of the longer distance motion estimation may be set to −31 to 31 or larger pixel distances.

However, no matter which method is employed, the computed motion vectors usually contain false estimates, that is, some estimated motion vectors do not represent the true motion vectors which are the projections of the 3D motion vectors into the image plane. There are a variety of reasons for this type of discrepancy. In differential methods, this may be due to that the constant brightness assumption is violated. In block matching methods, the error may come from a local minimum of the matching cost function, or in some cases, even the global minimum may not lead to a true motion vector. (Note: in the context of video coding, people are more interested in compression efficiency than the "truth" of the motion vectors so that an estimated motion vector is accepted even though it is incorrect but it gives the smallest matching cost and thus leads to fewer bits to encode the block residue.) However, in multi-frame SR, as in image registration/alignment and similar applications, we want "true" motion vectors, so the estimated motion vectors should be as close to the true ones as possible.

To achieve this, filtering the estimated motion vectors is suitably carried out. The type of filtering may vary, for the skilled in the art, in implementations. Examples include, just to mention a few: linear filtering (e.g., averaging or weighted averaging), non-linear (e.g. median filtering), or wavelet filtering. The filter size may be taken for example, as 5×5 for pixel-wise motion vector fields or 3×3 for block-wise motion vector fields. Since we are dealing with a vector field, the filtering can be done either in x- and y-components or in magnitudes and angles of the vectors. A vector field can also be filtered directly in vector form by tensor filtering.

The filtered motion vectors of the current frame, now with outliers removed and closer to the true motion vectors, can also be used in (fed into) the motion estimation algorithm (subroutine) as prediction of motion vectors to be estimated for the next frame. In block matching methods, this can accelerate the searching process of the target block. In multi-scale differential methods, this prediction can be used in different ways: as a guidance for building the image pyramids (how many levels are needed); calculating the relative motions from level to level; or reducing the number of iterations (if any).

This disclosure proposes a solution to accelerating the motion field estimation that is used in the integration of multiple images in video or image sequences. By using what we call the relative motion estimation approach within a TOI window and summing up the corresponding motion fields within and/or across TOI windows, we can avoid re-estimating the motion fields of each image with respect to the reference image which changes (is re-defined) as the recursion goes (i.e., the TOI slides in each recursive stage). This gives a substantial reduction of the number of the motion fields that are required to be estimated and boosts the real-time performance in video processing/applications, such as multi-frame super-resolution zooming.

Figure 6:
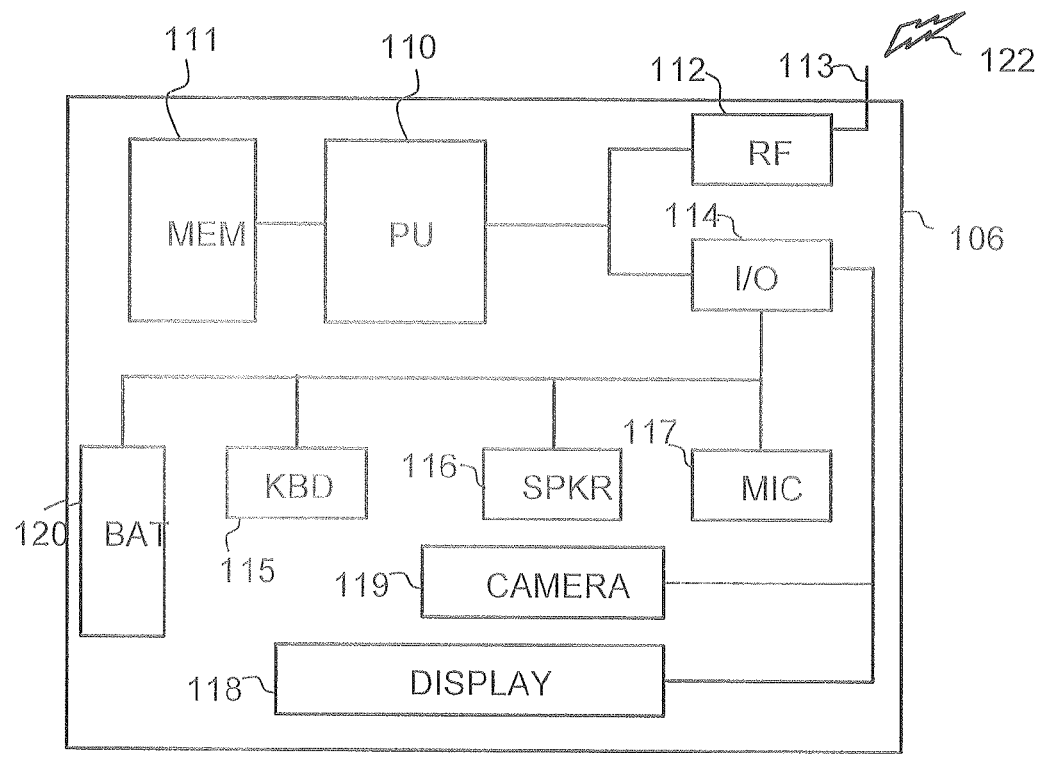
FIG. 6 is a functional block diagram that schematically illustrates a mobile communication device incorporating the present invention.

FIG. 6 illustrates schematically an arrangement in which video acceleration as summarized above may be realized. The arrangement is in FIG. 6 exemplified by a mobile communication device 106, e.g. a mobile phone. Although FIG. 6 shows an essentially complete mobile phone, it is possible to realize an arrangement that embodies video acceleration as summarized in the form of a subset of mobile phone functional units (including hardware as well as software units), e.g. in the form of a so-called mobile platform and other video display systems.

The communication device 106 comprises a processor 110, memory 111, a battery 120 as well as input/output units in the form of a microphone 117, a speaker 116, a display 118, a camera 119 and a keypad 115 connected to the processor 110 and memory 111 via an input/output interface unit 114. Radio communication via an air interface 122 is realized by radio circuitry (RF) 112 and an antenna 113. The processor 110 makes use of software instructions stored in the memory 111 and may cooperate with application specific hardware in order to control, in conjunction with logic circuitry incorporated in the processor 110 as well as in other parts of the device 106, all functions of the device 106, including the video acceleration as described in more detail above. The application specific hardware may be accelerators located in or at the display 118 or camera 119. The stream of video frames to be processed my be read from the memory 111 or streamed down via the input/output interface unit 114. The battery 120 provides electric power to all other units that reside in the mobile communication device 106. Details regarding how these units operate in order to perform normal functions within a mobile communication network are known to the skilled person and are therefore not discussed further.

It is to be noted that the illustration in FIG. 6 of a mobile communication device with a camera is not to be interpreted as limiting. That is, realization of the video acceleration is only one example and it is foreseen that it is useful in any device that has processing capabilities and where video acceleration is an issue. For example, such video acceleration may be used in high definition media systems, including TV sets, media players etc., where lower definition video content is re-scaled to high definition video content.

The invention may also be manifested in a computer program product, in other words the data entity residing in a device or stored on a medium or in a memory and intended for insertion in a device. Hence, according to another aspect, a computer program comprises program code means adapted to cause a data processing device to perform the steps of the method described above and in the following, when said computer program is run on the data processing device.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processors, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The previous description of particular embodiments is provided to enable persons skilled in the art to make and use the present invention. Various modifications to these embodiments will be apparent to those skilled in the art, and the generic principles defined herein may be applied to other embodiments without departing from the scope of the invention. The present invention is not intended to be limited to the embodiments shown herein but is only limited to the claims below.

The invention claimed is:

1. A method for estimation of interframe motion fields operating on a stream of video frames in multiframe integration, comprising:
   obtaining motion fields for a first set of (N) frames within a time of integration window;
   shifting the time of integration window by a number of frames (P) to a subsequent time of integration window;
   for a subsequent set of frames within the subsequent time of integration window, calculating relative motion fields (m), only for frames not in the previous time of integration window; and
   calculating absolute motion fields (M) between each frame and a reference frame of the subsequent time of integration window using the calculated relative motion fields (m) together with the applicable motion fields of the previous time of integration window, wherein
   the absolute motion fields (M) between each frame and a reference frame being the last frame (N−1) within the time of integration window using the relative motion fields (m) is calculated by tracking and adding the relative motion fields (m) vector-wise.

2. The method according to claim 1, wherein absolute motion fields (M) between each frame and a reference frame of the subsequent time of integration window are calculated using the calculated relative motion fields (m) together with the applicable relative motion fields (m) of the previous time of integration window.

3. The method according to claim 1, wherein absolute motion fields (M) between each frame and a reference frame of the subsequent time of integration window are calculated using the calculated relative motion fields (m) together with the applicable absolute motion fields (M) of the previous time of integration window.

4. The method according to claim 1, wherein the absolute motion fields (M) between each frame and a reference frame being the last frame (N−1) within the time of integration window using the relative motion fields (m) is calculated by tracking and adding the relative motion fields (m) vector-wise, using $$M_{0,N-1}(x, y) = m_{0,1}(x, y) + m_{1,2}(x + u_{0,1}(x, y), y + v_{0,1}(x, y)) + \ldots + m_{N-2,N-1}(x + u_{0,1}(x, y) + \ldots + u_{N-2,N-1}(x, y), y + v_{0,1}(x, y) + \ldots + v_{N-2,N-1}(x, y)),$$

where $u_{0,1}(x,y)$ and $v_{0,1}(x,y)$ are the x- and y-components of $m_{0,1}(x,y)$, which is a motion vector of the motion field $m_{0,1}$ at pixel location (x,y), i.e., $m_{0,1}(x,y) = [u_{0,1}(x,y)\ v_{0,1}(x,y)]^T$.

5. The method according to claim 1, wherein the absolute motion fields (M) between each frame and a reference frame being the last frame (N−1) within the time of integration window using the relative motion fields (m) is calculated by tracking and adding the relative motion fields (m) vector-wise, using $$M_{0,N-1}(X, Y) = m_{0,1}(X, Y) + m_{1,2}(X + u_{0,1}(X, Y), Y + v_{0,1}(X, Y)) + \ldots + m_{N-2,N-1}(X + u_{0,1}(X, Y) + \ldots + u_{N-2,N-1}(X, Y), Y + v_{0,1}(X, Y) + \ldots + v_{N-2,N-1}(X, Y)),$$

where $u_{0,1}(X, Y)$ and $v_{0,1}(X, Y)$ are the x- and y-components of $m_{0,1}(X, Y)$, which is a motion vector of the motion field $m_{0,1}$ of the macro-block with index (X, Y), i.e., $m_{0,1}(X, Y) = [u_{0,1}(X, Y)\ v_{0,1}(X, Y)]^T$.

6. The method according to claim 1, wherein the absolute motion fields (M) between each frame and a reference frame being the last frame (N−1) within the time of integration window using the relative motion fields (m) is calculated by tracking and adding the relative motion fields (m) vector-wise, using $$M_{0,N-1} = m_{0,1} + m_{1,2} + \ldots + m_{N-2,N-1},$$

where M and m are global motion vectors of the respective frames.

7. The method according to claim 1, comprising:
shifting the time of integration window by a number of frames (P) to a subsequent time of integration window;
for a subsequent set of frames within the subsequent time of integration window, calculating a number of P relative motion fields (m) between neighboring pairs of frames, only for frames not in the previous time of integration window; and
calculating absolute motion fields (M) between each frame and a reference frame of the subsequent time of integration window using the calculated relative motion fields (m) together with the applicable motion fields of the previous time of integration window.

8. The method according to claim 1, further comprising:
for consecutive time of integration windows, calculating new relative motion fields (m) between pairs of frames with alternating non-equal distances between them.

9. The method according to claim 8, wherein the alternating non-equal distances are determined by a periodic pattern.

10. The method according to claim 8, wherein the alternating non-equal distances are alternately a short distance, and a relatively longer distance.

11. The method according to claim 8, wherein the alternating non-equal distances are alternately a short distance of P frames, and a relatively longer distance.

12. The method according to claim 1, wherein the relative motion fields (m) between neighboring pairs of frames are estimated by differential (gradient) or block-based methods.

13. The method according to claim 1, wherein the motion fields between non-neighboring pairs of frames are estimated by block-based matching methods.

14. The method according to claim 8, wherein the search range of the matching algorithm is set to a first value for short distance motion estimation, and to a relatively larger value for long distance motion estimation.

15. The method according to claim 1, wherein the estimated motion fields (vectors) are filtered.

16. An apparatus comprising a memory and a processor coupled to the memory, the processor being configured to: (i) obtain motion fields for a first set of (N) frames within a time of integration window; (ii) shift the time of integration window by a number of frames (P) to a subsequent time of integration window; (iii) for a subsequent set of frames within the subsequent time of integration window, calculate relative motion fields (m), only for frames not in the previous time of integration window; and (iv) calculate absolute motion fields (M) between each frame and a reference frame of the subsequent time of integration window using the calculated relative motion fields (m) together with the applicable motion fields of the previous time of integration window, wherein
the absolute motion fields (M) between each frame and a reference frame being the last frame (N−1) within the time of integration window using the relative motion fields (m) is calculated by tracking and adding the relative motion fields (m) vector-wise.

17. A mobile communication device comprising the apparatus of claim 16.

18. A computer program product comprising a non-transitory computer readable medium comprising software instructions comprising: (i) instructions for obtaining motion fields for a first set of (N) frames within a time of integration window; (ii) instructions for shifting the time of integration window by a number of frames (P) to a subsequent time of integration window; (iii) instructions for calculating relative motion fields (m) for a subsequent set of frames within the subsequent time of integration window, only for frames not in the previous time of integration window; and (iv) instructions for calculating absolute motion fields (M) between each frame and a reference frame of the subsequent time of integration window using the calculated relative motion fields (m) together with the applicable motion fields of the previous time of integration window, wherein
the absolute motion fields (M) between each frame and a reference frame being the last frame (N−1) within the time of integration window using the relative motion fields (m) is calculated by tracking and adding the relative motion fields (m) vector-wise.

* * * * *

UNITED STATES PATENT AND TRADEMARK OFFICE
CERTIFICATE OF CORRECTION

PATENT NO. : 9,064,323 B2  
APPLICATION NO. : 13/390972  
DATED : June 23, 2015  
INVENTOR(S) : Xu et al.

Page 1 of 1

It is certified that error appears in the above-identified patent and that said Letters Patent is hereby corrected as shown below:

In the Specification

In Column 6, Lines 16-19, delete
"$M_{1,N}(x,y) = m_{1,2}(x,y) + m_{2,3}(x + u_{1,2}(x,y), y + v_{1,2}(x,y)) + \ldots + m_{N-2,N-1}(x + u_{1,2}(x,y) + \ldots + u_{N-2,N-1}(x,y), y + v_{1,2}(x,y) + \ldots + v_{N-2,N-1}(x,y))$," and insert --$M_{1,N}(x, y) = m_{1,2}(x, y) + m_{2,3}(x + u_{1,2}(x, y), y + v_{1,2}(x, y)) + \ldots$ $+ m_{N-1,N}(x + u_{1,2}(x, y) + \ldots + u_{N-1,N}(x, y), y + v_{1,2}(x, y) + \ldots + v_{N-1,N}(x, y))$, --, therefor.

In Column 11, Lines 36-37, delete "radio circuitry (RF)" and insert -- radio frequency (RF) --, therefor.

In the Claims

In Column 13, Line 24, in Claim 57, delete "$Y)[u_{O,1}(X, Y)\ v_{O,1}(X, Y)]^T$."

and insert -- $Y) = [u_{0,1}(X,Y)\ \ v_{0,1}(X,Y)]^T$, --, therefor.

Signed and Sealed this  
Twelfth Day of April, 2016

Michelle K. Lee  
*Director of the United States Patent and Trademark Office*